Figure 1:
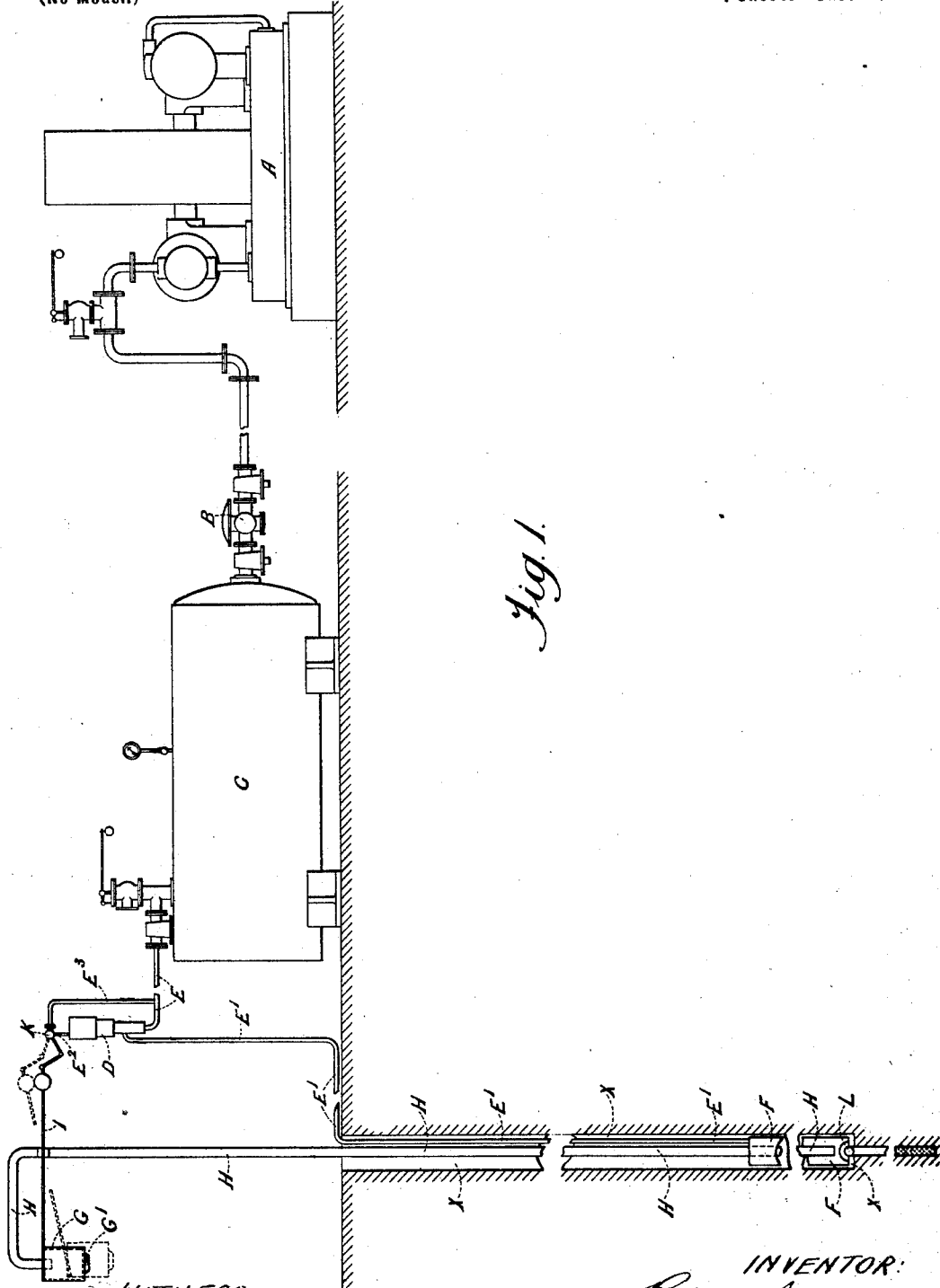

No. 717,048. Patented Dec. 30, 1902.
R. STIRLING.
APPARATUS FOR RAISING LIQUIDS, SUCH AS OIL, FROM OIL WELLS BY DIRECT AIR PRESSURE.
(Application filed July 10, 1902.)
(No Model.) 4 Sheets—Sheet 1.

WITNESSES:
Thomas Wallace
Arthur N. Edrop.

INVENTOR:
Robert Stirling
By his Attorneys,

No. 717,048. Patented Dec. 30, 1902.
R. STIRLING.
APPARATUS FOR RAISING LIQUIDS, SUCH AS OIL, FROM OIL WELLS BY DIRECT AIR PRESSURE.
(Application filed July 10, 1902.)

(No Model.) 4 Sheets—Sheet 2.

WITNESSES: INVENTOR:
Thomas Wallace Robert Stirling
Arthur N. Edrop By his Attorneys,
Arthur C. Fraser No. 717,048. Patented Dec. 30, 1902.
R. STIRLING.
APPARATUS FOR RAISING LIQUIDS, SUCH AS OIL, FROM OIL WELLS BY DIRECT AIR PRESSURE.
(Application filed July 10, 1902.)
(No Model.) 4 Sheets—Sheet 3.

WITNESSES:
Thomas J. Wallace
Arthur N. Edroh.

INVENTOR:
Robert Stirling
By his Attorneys

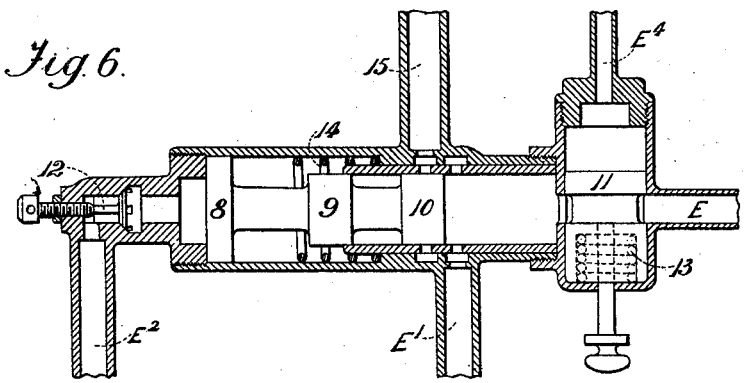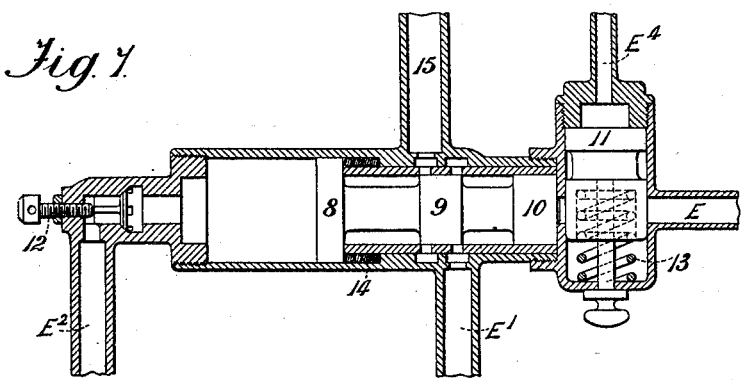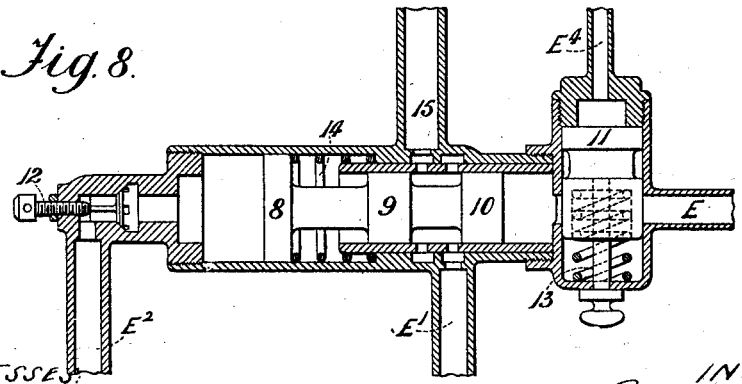

UNITED STATES PATENT OFFICE.

ROBERT STIRLING, OF BAKU, RUSSIA.

APPARATUS FOR RAISING LIQUIDS, SUCH AS OIL, FROM OIL-WELLS BY DIRECT AIR-PRESSURE.

SPECIFICATION forming part of Letters Patent No. 717,048, dated December 30, 1902.

Application filed July 10, 1902. Serial No. 115,096. (No model.)

*To all whom it may concern:*

Be it known that I, ROBERT STIRLING, engineer, of Baku, Russia, have invented certain new and useful Improvements in Apparatus for Raising Liquids, Such as Oil, from Oil-Wells by Direct Air-Pressure, of which the following is a specification.

This invention relates to improvements in apparatus for raising liquids, such as oil, from deep wells by means of compressed air directly applied, and is particularly applicable where the level of the liquid is less than fifty per cent. of the depth of the well.

The object of the invention is to provide apparatus capable of raising liquid from a well by any available air-pressure irrespective of the depth of the well; but to obtain the best results the tubes, chamber, and air-pressure should be proportioned to each other and to the depth of the well, the height at which the liquid stands in it, and the quantity of liquid to be lifted. The only working part in the well is a non-return valve, which may be of the simplest construction and which may be inserted and removed without withdrawing the whole of the well-tubing.

In apparatus according to this invention the liquid to be raised is admitted by a non-return valve to a chamber located at the point whence the liquid is to be raised, and direct air-pressure is then admitted to the top of said chamber to force the contained liquid up a discharge-pipe, the air-pressure being, if required, cut off before the whole of the liquid is discharged, so that the air in the chamber may work expansively to discharge the remainder. Some of the discharged liquid is admitted to a vessel, where the increased weight due to such admission serves, by means of a connecting counterbalanced lever, to actuate, by means of a cock, a controlling device in the form of piston-valves, which serve to cut off and admit at the required periods the air-pressure necessary for the raising of liquid from the aforesaid chamber and also opens the top of said chamber to the atmosphere at the proper time to allow of the discharge of any remaining air, so that the inflow of a full charge of liquid is not impeded. A suitable retarding device, such as a dashpot, is arranged, in connection with the controlling device, to allow time for the respective operations to take place.

Figure 4:
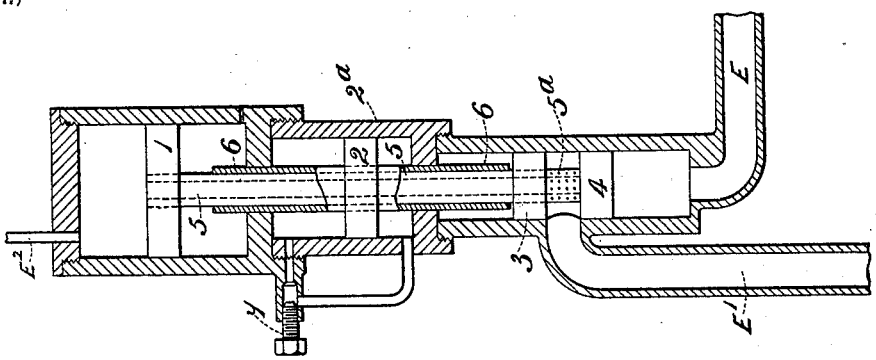
Figure 3:
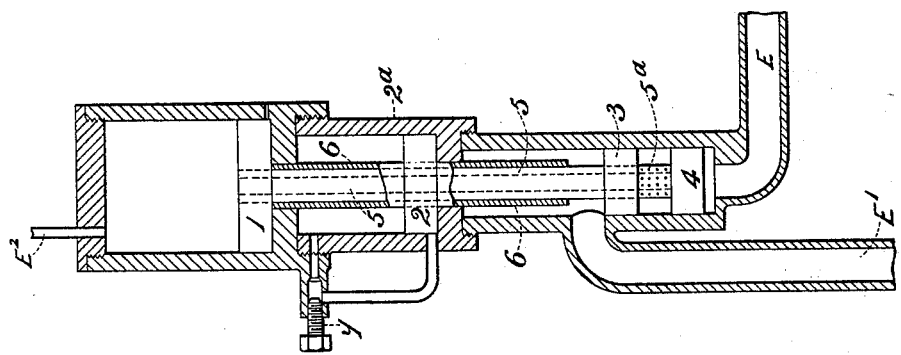
Figure 2:
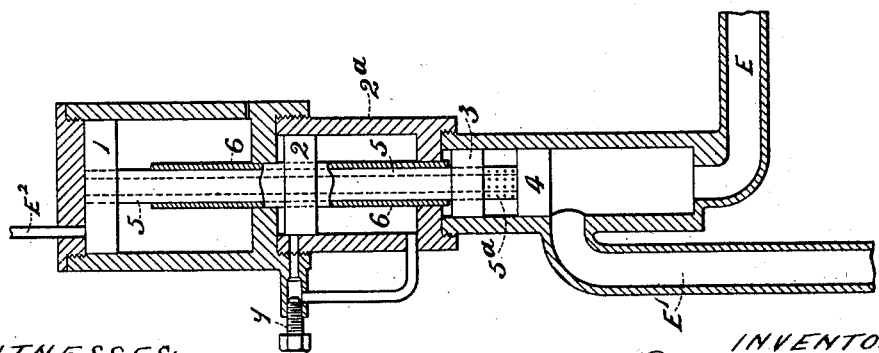
Figure 5:
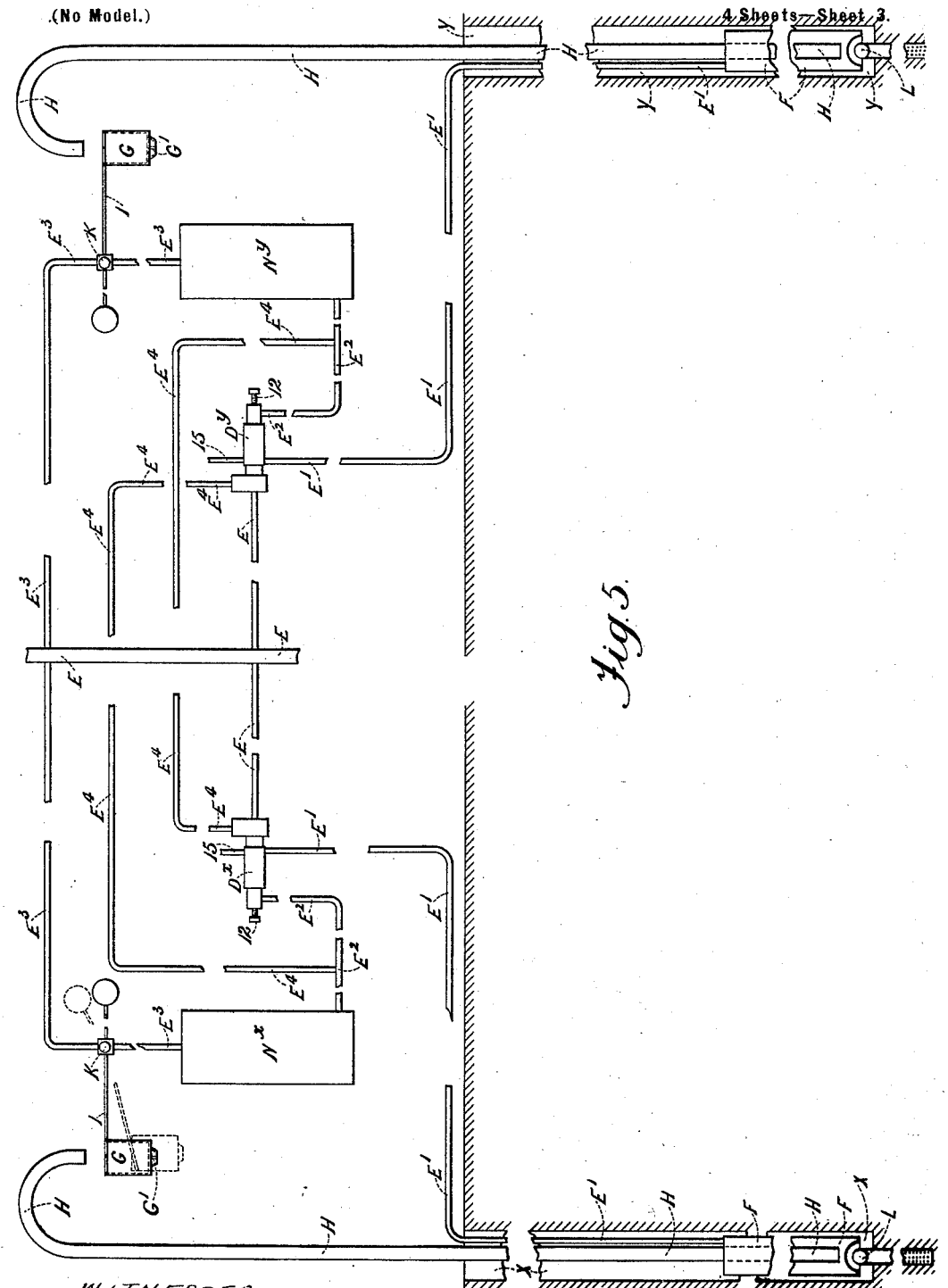

In the accompanying drawings, Figure 1 is a sectional elevation illustrating diagrammatically the general arrangement of the improved apparatus specially designed for raising oil from a deep-bore oil-well. Figs. 2, 3, and 4 are vertical sectional views, on a larger scale, showing the construction and working of the controlling device shown in Fig. 1, Fig. 2 illustrating the said device in one end position and Fig. 3 showing the device in the other end position. Fig. 4 shows the device in an intermediate position. Fig. 5 is a sectional elevation showing diagrammatically a modification of the improved apparatus suitable for working two wells alternately in conjunction with each other. Figs. 6, 7, and 8 are views similar to Figs. 2, 3, and 4 of a modified form of controlling-valve used in such modification.

Referring first to Figs. 1 to 4, the improved apparatus comprises a supply of compressed air suitably provided by an air-compressor A and a pressure-regulating valve B, admitting air to a reservoir C at the required pressure. The reservoir is fitted with cocks, safety-valve, and pressure-gage, as shown. A controlling device in the form of a piston-valve D is connected at one end to the compressed-air main E and also to an air-pipe E', leading to the deep-bore oil-well X, and at its other end by a pipe E² through a three-way cock K to the atmosphere, and also through a pipe E³ to the air-main E. A chamber F, with a non-return valve L to admit the oil, is located at the bottom of the well. The pipe E' serves to admit compressed air at the top of said chamber and a discharge-pipe H reaching to near the bottom of said chamber. A weighted lever I, supporting at one end a vessel G, is connected at the other end to the lever of the three-way cock K. The controlling-valve D is shown in section in three positions, so that its construction and working may be understood. It consists of three cylinders containing, respectively, pistons 1 2 and 3 4. Pistons 1, 3, and 4 are on the same hollow rod 5, and piston 2 has a tubular rod 6 working over rod 5. The piston 2 serves only to retard the movement of the other pistons during part of their stroke, its cylinder 2ᵃ being filled with water or other retarding liquid, and the communication between the upper and lower side of the piston being restricted by the adjustable valve 7.

The operation of the apparatus is as follows: Compressed air passes from the compressor A through the pressure-reducing valve B to the reservoir C and thence by the air-main E to the controlling-valve D, which is in the position shown in Fig. 2, and through the pipe E' to the chamber F, whence it forces the oil contained therein out through the discharge-pipe H, a portion of the liquid entering the vessel G on the end of the lever I. The weight of this liquid weighs down the lever from the position shown in full lines to the position shown by dotted lines, thereby operating the three-way cock K to admit air-pressure to the top piston 1 of the controlling-valve D, and thus causing the piston-valves 3 and 4, after being retarded while the liquid passes from the under to the upper side of the piston 2, to assume the positions shown in Fig. 3, thereby cutting off the supply of air to the chamber F and allowing the expansion of the air in the pipe E' and in chamber F to finish the discharge of the liquid from said chamber out through the discharge-pipe H. When the liquid has all been discharged, the air escapes through pipe H and allows the liquid to refill the chamber F through the valve L. By this time the vessel G has emptied itself through a small hole G' in its bottom, and the lever I can now resume its original position, thereby moving the three-way cock K so as to put the top of the piston 1 of the controlling-valve D in communication with the atmosphere through the pipe E² and cock K. The air-pressure on the under side of the smaller piston 4 then immediately forces the piston-valves 3 and 4 to the position shown in Fig. 4, allowing any remaining air in the top of the chamber F to escape through the perforations 5ᵃ in the hollow rod 5 and allowing the chamber F to fill again completely with liquid. As the retarding liquid in the cylinder 2ᵃ escapes from the upper to the lower side of the piston 2 through the valve 7, the piston-valves gradually resume the positions shown in Fig. 2 and the whole operation is repeated.

The apparatus may be varied without departing from the nature of the invention, and circumstances will demand alterations in arrangement and construction. For instance, the air-pipe E' in the well may be placed inside the discharge-pipe H, or the discharge-pipe H may be placed inside the air-pipe E', or the liquid may first be discharged into a tank and thence flow into the vessel G, attached to the lever I, which actuates the three-way cock K, or the form of this vessel G and lever I may be altered.

My invention has the advantage over prior apparatus that no float or other apparatus is required in the chamber F, so that this chamber can be made of very small diameter, whereby it is adapted to be placed in deep wells or similar contracted places. Instead of a float or the like in this chamber I employ as the controlling device a means exterior to this chamber and preferably wholly outside the well and which instead of being actuated by the liquid in the chamber is actuated by the liquid discharged therefrom. Such controlling means preferably comprises a vessel for receiving the discharge or some portion thereof and a movable part actuated by the accumulated discharge and which in turn operates the controlling-valve. The preferred construction is that shown, wherein the discharge or a portion thereof is received in a vessel which is hung upon a movable part, such as the lever I, so that the weight of the liquid actuates this movable part or lever, and thereby communicates motion to the valve. Preferably the valve mechanism is divided into two portions or members—namely, a primary valve or cock operated by such lever and a secondary valve, which latter immediately controls the connection of the air-pipe E', leading to the chamber F, alternately with the source of compressed air and with the atmosphere.

The apparatus is capable of various modifications by which liquids can be raised in the manner described from deep wells by air at a pressure much less than corresponds to the head due to the height to which the liquid is raised.

Referring to Fig. 5, which shows a modification of the apparatus for working two wells X and Y together, but alternately, two chambers Nˣ Nʸ are employed, one at each well. Each chamber contains liquid which when acted upon by the air admitted through the three-way cock K and pipe E³ from the air-main E transmits the pressure through the pipes E² E⁴ and moves the pistons of the two similar controlling-valves Dˣ Dʸ, of modified construction, in the manner to be described.

The modified form of the controlling-valves Dˣ Dʸ is shown in section in Figs. 6, 7, 8, which illustrate, respectively, the two end and intermediate positions of each valve. Each valve comprises a cylinder containing pistons 8 9 10, and in addition a smaller cylinder containing piston 11. The retarding of the movement of the pistons is effected in this case without the use of a separate cylinder, because a liquid being used in place of air to effect the movement of the piston 8 it is sufficient to restrict the egress of the liquid by the valve 12 in order to obtain the required retardation. The piston-valve 11 is forced against a spring 13 by the pressure communicated through pipe E⁴ from the companion well, and in this position air is admitted to the well. It is held in this position by an automatic catch, (not shown,) which is only released when piston 10 reaches the position shown in Fig. 7. Piston 11 is then immediately moved by the spring to the position shown, thereby shutting off air from the well until moved again by the pressure through pipe E⁴ from the neighboring well.

The mode of operation is as follows: At starting the piston 11 of valve D˟ is moved by hand to the position shown in Fig. 6, thereby admitting air-pressure, and the pistons 8 9 are forced into the positions shown and air is admitted to well X through pipe E'. As soon as the discharge begins from well X the vessel G belonging to that well is filled, and assuming the position shown by the dotted lines moves the three-way cock K, so that air-pressure is admitted to vessel N˟ and, acting on the liquid through pipe E², forces the pistons 8 9 10 in D˟ to the positions shown in Fig. 7, cutting off the air-supply to well X. At the same time the pressure acting through pipe E⁴ moves the piston 11 of D^y and air is admitted to well Y, the pistons in D^y assuming the position shown in Fig. 6. When the discharge is finished from well X, the vessel G empties through the hole in the bottom and is returned to its original position by the counterweight moving the three-way cock K. The pressure is removed from the liquid in N˟ and from the pipe E² E⁴ and the pistons 8 9 10 of D˟ gradually assume the positions shown in Fig. 8, being moved by the spring 14, the movement being retarded to the required degree by the screw-down valve 12. In this position the well-pipe E' is open to the atmosphere through the aperture 15, allowing the chamber F to fill completely. This position is maintained until, well Y having begun to discharge, its vessel G is filled and actuates the three-way cock K to admit pressure to the vessel N^y and through E⁴ moves the piston 11 of D˟, admitting air-pressure, which forces pistons 8 9 10 to the positions shown in Fig. 6, when the operation begins again. At the same time the pressure is transmitted through E² to valve D^y, the pistons in which assume the positions shown in Fig. 7, shutting off air-pressure from well Y until well X has again begun to discharge. In due course D^y assumes the position shown in Fig. 8 and the chamber F in well Y fills. When well X has again begun to discharge, pressure is transmitted to piston 11 of D^y, air is admitted, and the pistons assume the positions shown in Fig. 6, admitting air to well Y, and the cycle of operations is repeated.

The mode of operation is the same when several wells are arranged to work alternately in groups or in rotation.

What I claim, and desire to secure by Letters Patent, is—

1. In apparatus for raising liquid from deep wells by air-pressure, the combination of a closed chamber located in the well and fitted with a non-return inlet-valve for the admission thereinto of the liquid to be raised, a pipe for discharging said liquid out of said chamber, an air-pipe connected to said chamber, a piston-valve having a smaller end piston normally exposed to the compressed air and an opposite larger end piston, a three-way valve opening communication between said larger piston and the atmosphere to permit said valve to be opened and a supply of compressed air to be conducted through said air-pipe to said chamber to expel and raise the liquid therefrom and alternately opening communication between said larger piston and the compressed-air supply to move said valve to cut off the supply of compressed air to said chamber, and an automatic device exterior to said chamber and operated by the discharge therefrom for alternately opening and closing said three-way valve.

2. In apparatus for raising liquid from deep wells by air-pressure, the combination of a closed chamber located in the well and fitted with a non-return inlet-valve for the admission thereinto of the liquid to be raised, a pipe for discharging said liquid out of said chamber, an air-pipe connected to said chamber, a piston-valve having a smaller end piston normally exposed to the compressed air and an opposite larger end piston, a three-way valve opening communication between said larger piston and the atmosphere to permit said valve to be opened and a supply of compressed air to be conducted through said air-pipe to said chamber to expel and raise the liquid therefrom and alternately opening communication between said larger piston and the compressed-air supply to move said valve to cut off the supply of compressed air to said chamber, said valve carrying also a discharge-port permitting the discharge of air from said chamber after the supply of compressed air has been cut off therefrom, and an automatic device exterior to said chamber and operated by the discharge therefrom for alternately opening and closing said three-way valve.

3. In apparatus for raising liquid from deep wells by air-pressure, the combination of a closed chamber located in the well and fitted with a non-return inlet-valve for the admission thereinto of the liquid to be raised, a pipe for discharging said liquid out of said chamber, an air-pipe connected to said chamber, a piston-valve having a smaller end piston normally exposed to the compressed air and an opposite larger end piston, a three-way valve opening communication between said larger piston and the atmosphere to permit said valve to be opened and a supply of compressed air to be conducted through said air-pipe to said chamber to expel and raise the liquid therefrom and alternately opening communication between said larger piston and the compressed-air supply to move said valve to cut off the supply of compressed air to said chamber, said valve carrying also a discharge-port permitting the discharge of air from said chamber after the supply of compressed air has been cut off therefrom, an automatic device exterior to said chamber and operated by the discharge therefrom for alternately opening and closing said three-way valve, said automatic device being operated upon the discharge of a portion of the liquid from said chamber to cut off the admission of compressed air, and a retarding device for said piston permitting the residue of compressed air in said chamber to continue the expulsion of the liquid before said chamber is opened to the atmosphere.

4. In apparatus for raising liquid from deep wells by air-pressure, the combination of a closed chamber located in the well and fitted with a non-return inlet-valve for the admission thereinto of the liquid to be raised, a pipe for discharging said liquid out of said chamber, an air-pipe connected to said chamber, a piston-valve having a smaller end piston normally exposed to the compressed air and an opposite larger end piston, a three-way valve opening communication between said larger piston and the atmosphere to permit said valve to be opened and a supply of compressed air to be conducted through said air-pipe to said chamber to expel and raise the liquid therefrom and alternately opening communication between said larger piston and the compressed-air supply to move said valve to cut off the supply of compressed air to said chamber, said valve carrying also a discharge-port permitting the discharge of air from said chamber after the supply of compressed air has been cut off therefrom, an automatic device exterior to said chamber and operated by the discharge therefrom for alternately opening and closing said three-way valve, said automatic device being operated upon the discharge of a portion of the liquid from said chamber to cut off the admission of compressed air, and a retarding device operating in both directions against said valve for first permitting the residue of compressed air in said chamber to continue the expulsion of the liquid before said chamber is opened to the atmosphere and for then giving time for the refilling of said chamber before again admitting compressed air thereto.

5. In apparatus for raising liquid from deep wells by air-pressure, the combination of a closed chamber F located in the well and fitted with a non-return inlet-valve for the admission thereinto of the liquid to be raised, a pipe for discharging said liquid out of said chamber, an air-pipe E' connected to said chamber, a piston-valve D having a smaller end piston 4 normally exposed to the compressed air and an opposite larger end piston 1, a three-way valve K opening communication between said larger piston and the atmosphere to permit said valve D to be opened and a supply of compressed air to be conducted through said air-pipe E' to said chamber F to expel and raise the liquid therefrom and alternately opening communication between said larger piston 1 and the compressed-air supply to move said valve to cut off the supply of compressed air to said chamber, said valve carrying also a discharge-port $5^a$ permitting the discharge of air from said chamber after the supply of compressed air has been cut off therefrom, an automatic device exterior to said chamber F and operated by the discharge therefrom for alternately opening and closing said three-way valve K, said automatic device being operated upon the discharge of a portion of the liquid from said chamber to cut off the admission of compressed air, a piston 2 mounted on a rod arranged between said larger and smaller end pistons 4 and 1, and a cylinder $2^a$ in which said piston 2 moves and which is filled with retarding liquid and provided with a restricted by-pass communicating between the opposite sides of the piston, whereby said piston 2 retards the operation of the valve in both directions so as to permit the residue of compressed air from the chamber F to continue the expulsion of the liquid before the chamber is opened to the atmosphere and so as to give time for the refilling of said chamber before again admitting compressed air thereto.

In witness whereof I have hereunto signed my name in the presence of two subscribing witnesses.

ROBERT STIRLING.

Witnesses:
HENRY ALLEN PRYOR,
ERNEST F. FOTHERGILL.